United States Patent [19]

Mezei

[11] Patent Number: 5,312,569
[45] Date of Patent: May 17, 1994

[54] METHOD FOR MARRING FIBER OPTIC SUBSTRATES

[75] Inventor: George A. Mezei, Huntington Beach, Calif.

[73] Assignee: Poly-Optical Products, Inc., Irvine, Calif.

[21] Appl. No.: 785,130

[22] Filed: Oct. 30, 1991

[51] Int. Cl.⁵ .............................................. B29C 59/04
[52] U.S. Cl. ................................... 264/1.500; 51/78; 264/1.6; 264/2.7; 264/162; 264/175; 264/293; 425/367; 425/385; 425/DIG. 5
[58] Field of Search ............... 264/1.5, 162, 293, 175, 264/1.6, 2.7; 425/375, 367, DIG. 5; 51/78, 80 A

[56] References Cited

U.S. PATENT DOCUMENTS

| | | |
|---|---|---|
| 1,724,704 | 10/1923 | Fox . |
| 2,463,750 | 3/1949 | Curtin ........................ 51/78 |
| 2,793,475 | 5/1957 | Teetz, Sr. .................... 51/78 |
| 3,851,423 | 12/1974 | Repetto . |
| 4,217,084 | 8/1980 | Jacques et al. . |
| 4,528,148 | 7/1985 | Dotti ......................... 264/293 |
| 4,639,346 | 1/1987 | Pav et al. ................... 264/175 |
| 4,872,824 | 10/1989 | Williams et al. . |
| 4,925,599 | 5/1990 | Turk et al. . |
| 4,929,169 | 5/1990 | Fujigaki et al. . |
| 4,941,290 | 7/1990 | Holyoke . |

FOREIGN PATENT DOCUMENTS

| | | | |
|---|---|---|---|
| 62-192701 | 8/1987 | Japan . | |
| 63-318502 | 12/1988 | Japan . | |
| 1009793 | 4/1983 | U.S.S.R. ............... | 264/162 |

Primary Examiner—Jeffery Thurlow
Assistant Examiner—Mathieu Vargot
Attorney, Agent, or Firm—Robbins, Berliner and Carson

[57] ABSTRACT

A method and apparatus for marring the surface of a fiber optic substrate by feeding the substrate between a pair of rotating rollers. One of the rollers is coated with an abrasive. The second roller may be hard or have a deformable cover. Alternatively, one or both rollers may be serrated to produce a ripple pattern in the substrate. A hydraulic, pneumatic or other device is used for either manually and/or automatically adjusting the gap between the rollers. One or both rollers may also be heated to further enhance the marring action. A cam mechanism may also be used to adjust the pressure in the nip.

12 Claims, 4 Drawing Sheets

5,312,569

METHOD FOR MARRING FIBER OPTIC SUBSTRATES

This invention relates to surface marring of a fiber optic substrate to create a fiber optic backlighting device and, in particular, to the use of rotating rollers for this purpose.

BACKGROUND OF THE INVENTION

Fiber optic substrates are comprised of one or more optical fibers grouped together in a ribbon or panel substrate configuration. Typically, the ribbon or panel substrate is about 0.01 to 0.03 inches thick. If one or more surfaces of the substrate are marred or abraded and a light source is applied to one end of the marred substrate, light will emit from the marred area. Accordingly, such a substrate may be marred to create a specific illumination pattern which can be effectively used to backlight a variety of displays. Increased surface marring also results in increased light emission. Accordingly, light intensity can also be varied along the length of the substrate by varied marring.

Previously, marring of fiber optic substrates was achieved by stamping the substrate with a roughened plate. In particular, a substrate would be placed on a cushion and a stamp having a covering, such as emery paper, would be pressed against the substrate to deform its surface. To increase the amount of surface marring along the substrate, the cushion was placed on a plate having a particular profile. For example, placing the cushion on a plate having an uprising surface, then stamping the substrate against the cushion, would result in minimal marring at the low end of the plate and greater marring at the high end of the plate. This marring pattern was particularly desirable when a single light source was to be applied at one end of the marred substrate. The result would be uniform lighting along the device due to the slight marring near the light source and the progressively greater marring as the distance from the light source increased. A symmetrically curved plate was also used wherein the greatest surface marring occurred at the middle of the substrate. Such a device provided uniform illumination when light sources were placed at both ends of the device. For further details, see U.S. Pat. No. 4,929,169 to Fujigaki et al. entitled Working Equipment For Roughening The Side Of Optical Fiber.

The stamping method described above has a number of disadvantages. One problem is that the length of substrate to be treated at one time is limited by the size of the stamp. Different sized stamps may be used, but larger stamps would obviously require more force to achieve the desired pressure profile against the cushion and plate. Furthermore, as the size of the stamp increases, it becomes more difficult to accurately apply the different simultaneous pressures required to produce a desired marring pattern along the substrate due to the larger cross sectional area of the plate. An additional problem is the necessity to change plates on the apparatus whenever a different marring pattern is desired.

Accordingly, a need has arisen for an apparatus that permits marring of substrates having different lengths or that require different marring patterns without interrupting operation of the apparatus to substitute suitable parts. It is also desirable that such an apparatus be capable of gradually and accurately altering the pressure profile applied to the substrate, again without interrupting operation of the apparatus.

SUMMARY OF THE INVENTION

The present invention is directed to a method and apparatus for marring the surface of a fiber optic substrate by feeding the substrate between a pair of rotating rollers. One of the rollers is coated with an abrasive. The second roller may be hard or have a deformable cover. The second roller may also have an abrasive coating. Alternatively, one or both rollers may be serrated to produce a ripple pattern in the substrate. A hydraulic, pneumatic or other device is used for either manually and/or automatically adjusting the gap between the rollers to alter the pressure and action of the abrasive roller over the length of the substrate being processed. Computer controls may also be used. One or both rollers may be heated to further enhance the marring action. One or both rollers may also be pivotable in a vertical direction to create an angle between the rollers. This results in a larger gap at one end of the rollers than the other causing a gradual increase or decrease of nip or contact pressure along the length of the rollers.

Use of the apparatus and method described herein provides a number of advantages over the prior art. First, because surface marring occurs as the substrate is fed through the gap between the rollers, less force is required to mar the substrate than in the prior art stamping method. The nip or contact pressure line between the rollers is easier to control and accurately maintain than pressure developed across a stamping plate. A further advantage of the present apparatus and method is that any marring pattern may be created on the substrate surface by adjusting the speed of the substrate through the nip (to thereby change the time duration during which the substrate is subjected to pressure and/or heat) and/or altering the pressure in the nip as the substrate moves therethrough and/or creating a pressure differential along the nip or contact pressure line between the rollers. In other words, most any illumination profile along the surface of the substrate is possible.

The use of a cam mechanism to adjust the pressure in the nip is also beneficial. For example, a cam is especially useful in achieving gradual differentiation of surface marring along the substrate. A cam may also be used to give substrates of differing lengths the same illumination profile by simply setting the cam speed appropriately. Additionally, the cam mechanism may be used to transmit a repetitive pressure profile to the nip for making a number of identically treated substrates.

Notably, the above advantages are achieved without the necessity of using different shaped plates or different sized stamps, as required in the prior art.

DETAILED DESCRIPTION

Figure 1:
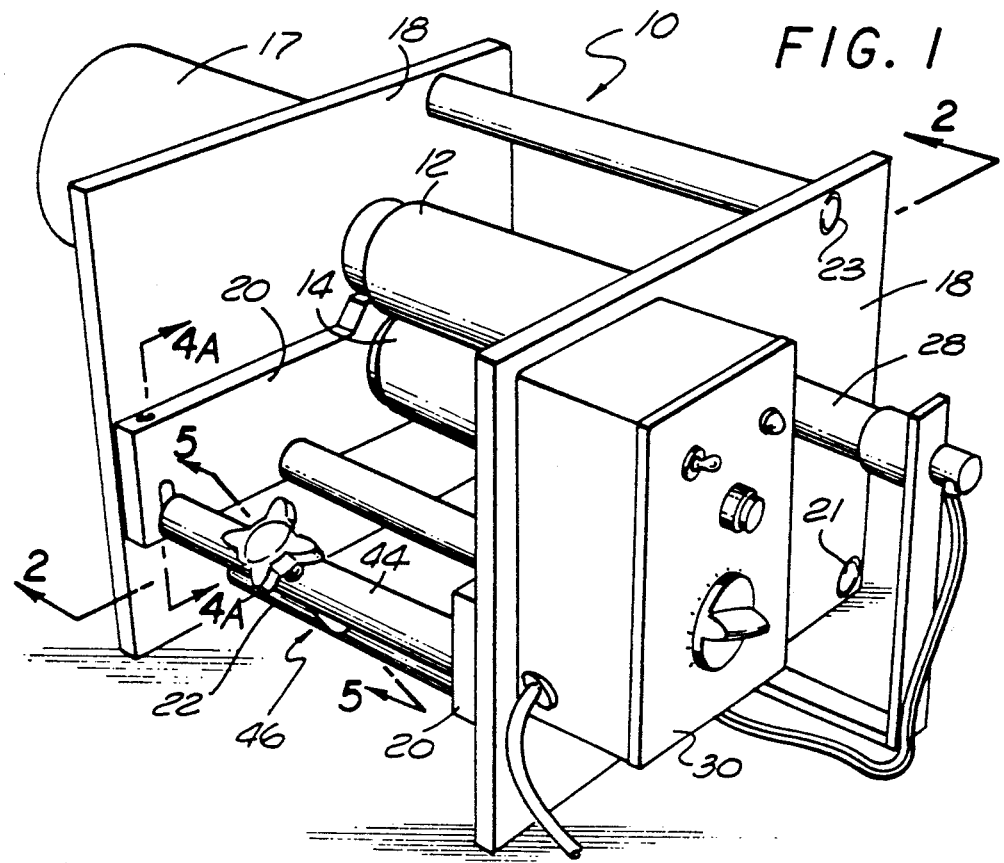
FIG. 1 is a perspective view of a first preferred embodiment of a marring apparatus according to the present invention.
Figure 2:
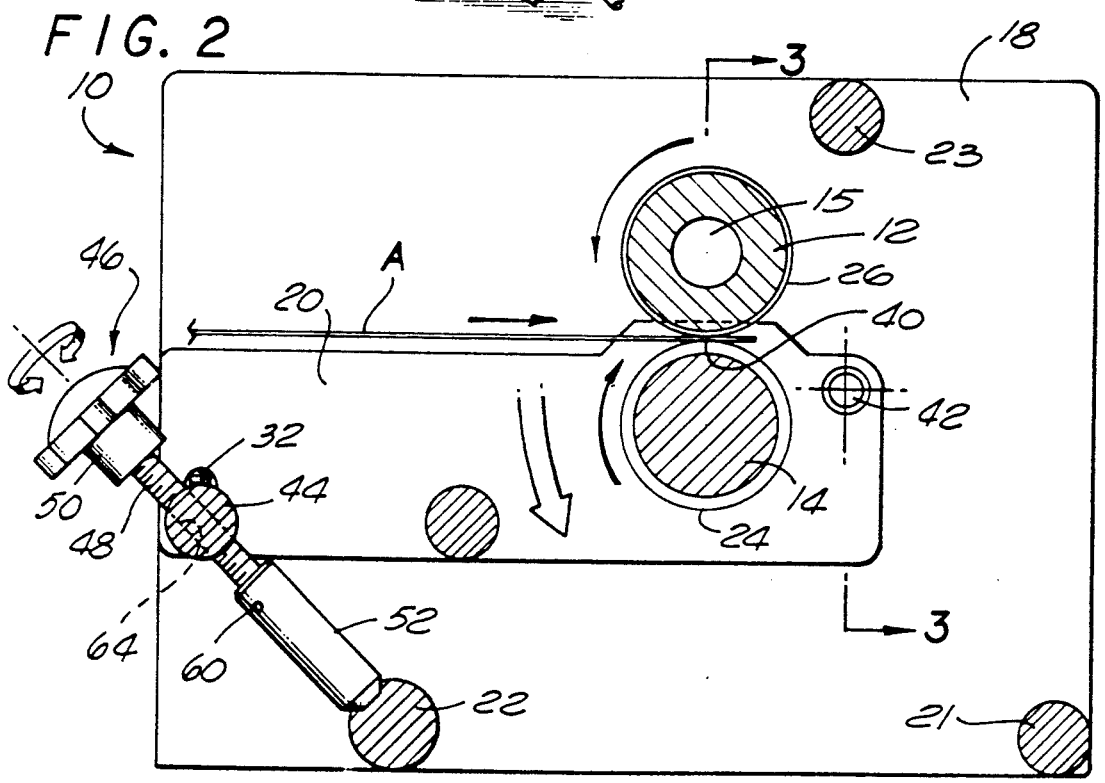
FIG. 2 is a cross-sectional side elevational view of the marring apparatus taken along line 2—2 of FIG. 1.
Figure 3:
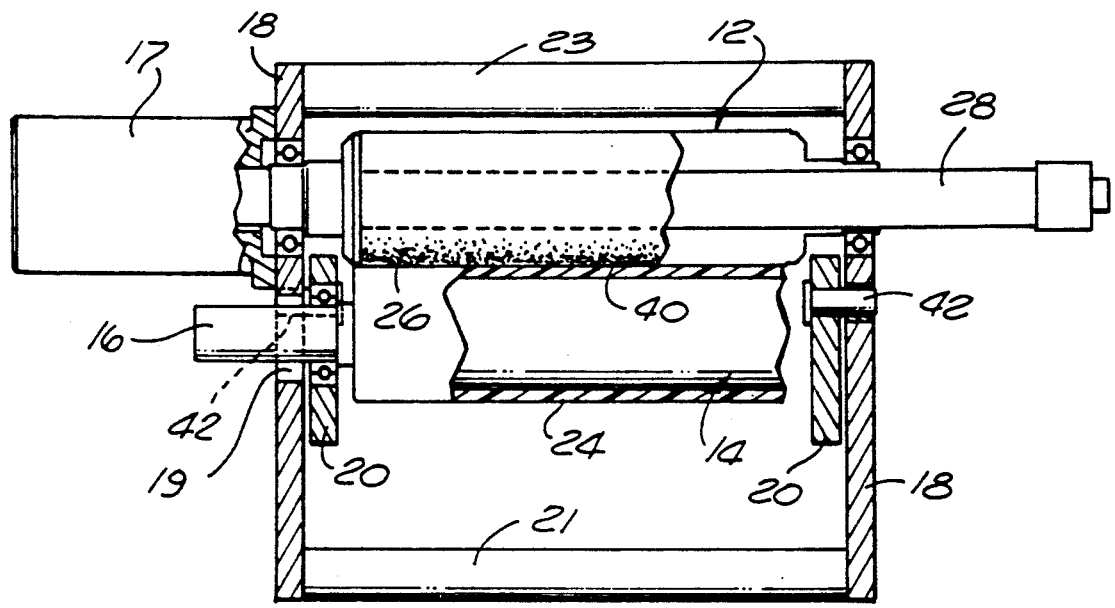
FIG. 3 is a cross-sectional front elevational view of the marring apparatus taken along line 3—3 of FIG. 2.

A preferred apparatus for marring a fiber optic substrate embodying the present invention is shown in FIGS. 1-3 at 10. The apparatus includes a top roller 12, a bottom roller 14, side plates 18 and rocker arms 20. The side plates 18 are secured to a plurality of connecting rods 21, 22, 23 that extend between the side plates 18 for lateral support.

The top roller 12 may be made from low carbon, hot rolled bar, A-36 steel. A bore 15 extends through the top roller 12 for receiving a conventional heating element 28 from a conventional heater 30. Preferably, the heater 30 is sufficient to heat the top roller 12 to about 200° F. The top roller 12 is mounted to the side supports 16 and is driven by motor 17. Preferably, the motor is an adjustable speed DC motor. Alternatively, the roller may be operated manually, as by a handcrank (not shown). The surface 26 of the top roller is roughened or, preferably, covered with a diamond coating or, alternatively, 120 grit sandpaper.

The bottom roller 14 may be made from low carbon-free machining steel. The bottom roller 14 has a shaft 16 that is mounted to rocker arms 20 (see FIG. 3). The shaft 16 may, if desired, extend through openings 19 of the side plates 18 to be operatively engaged to a second motor (not shown). The openings 19 are larger in diameter than the shaft of the bottom roller 14 to permit the bottom roller 14 to move closer to or farther from the top roller 12. It is noted that the motor 17 for the top roller may be used to drive the bottom roller e.g., by the frictional forces between the rollers or by meshing gears between the rollers. Alternatively, only the bottom roller 14 may be driven. In the preferred embodiment, the bottom roller is provided with a deformable covering 24, such as rubber or polyurethane, having 90±3 Durometer, shore A.

A nip or contact pressure line 40 is defined between the top roller 12 and the bottom roller 14. A length of substrate, such as a ribbon A, passes through the nip 40 in the direction of the arrow (see FIG. 2). The direction of the rollers may also be reversed to permit the same ribbon to pass back and forth through the nip. A horizontally disposed piece of sheet metal (not shown) may be secured between the side plates 18 and used to support the ribbon as it passes through the nip 40. A second piece of sheet metal may be used to support the ribbon as it passes out from the nip. A clear plastic safety shield (not shown) may also be placed in front of and over the top roller to prevent an operator from getting his or her fingers caught in the nip.

Referring to FIGS. 2 and 3, the rocker arms 20 are rotatably mounted to pivot rods 42 which cantilever out from and are supported by the side plates 18. Preferably, the pivot rods 42 are secured to the rocker arms 20 adjacent the bottom roller 14 and below the nip 40.

Pressure in the nip may be adjusted through the use of a screw mechanism 46 which acts upon a bar 44 mounted to and extending between the rocker arms 20. Preferably, the bar 44 is secured to the rocker arms at a sufficient distance from the nip to act as a lever when the bar 44 is moved upwardly to increase pressure in the nip.

Figure 4A:
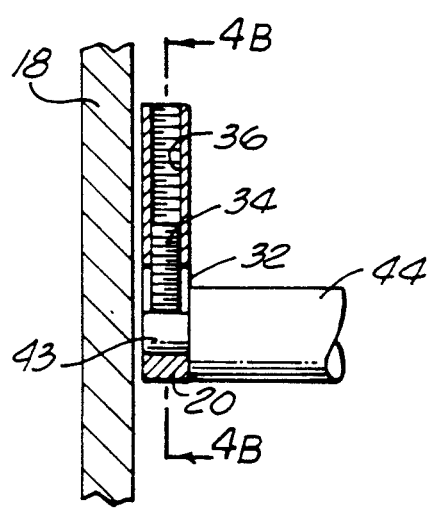
FIGS. 4A and 4B are a cross-sectional front view taken along line 4A—4A of FIG. 1 and a cross-sectional side view taken along line 4B—4B of FIG. 4A, respectively, of means for adjusting the height of the bar disposed through the slot in the rocker arm of the marring apparatus.
Figure 4B:
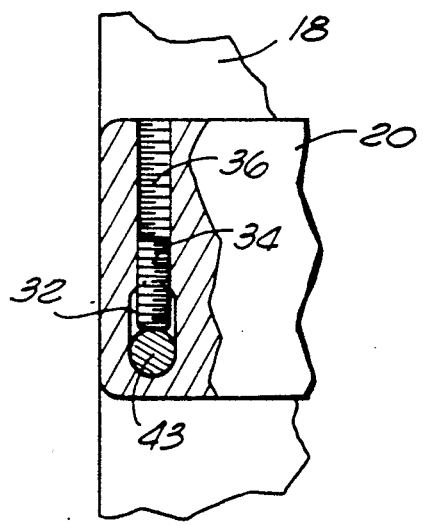

In the preferred embodiment, an extension 43 of the bar 44 is received in a slot 32 of each rocker arm 20 (see FIGS. 4A and 4B). Each rocker arm also has a vertical bore 34 for receiving an adjustable screw 36 for setting an upper limit to which each extension 43 of bar 44 may move in the slot 32 during application of pressure to the nip. In other words, the height of each end of the bar 44 may be separately adjusted to insure that uniform pressure will be applied in the nip along the length of the rollers. Alternatively, the adjustable screws 36 may be set such that pressure in the nip will increase or decrease along the length of the rollers. This would be beneficial if it was desired to insert a ribbon lengthwise into the nip.

Figure 5A:
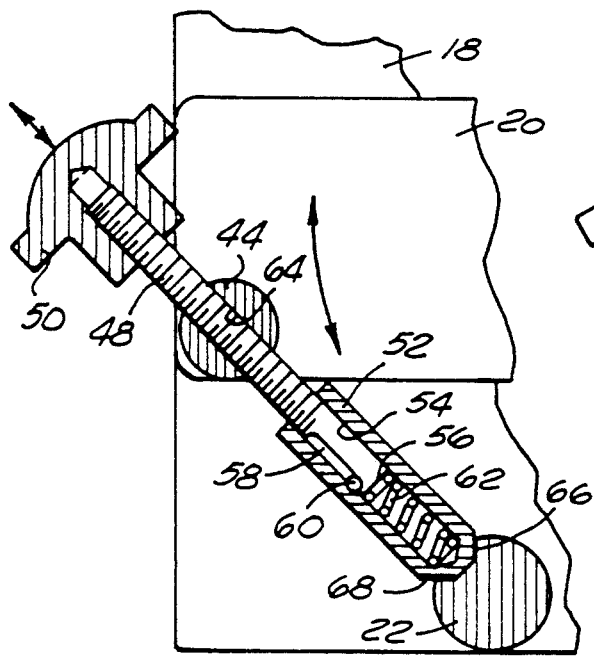
FIGS. 5A and 5B are cross-sectional side views taken along line 5—5 of FIG. 1, of the screwing mechanism in an engaged position and a disengaged position, respectively.
Figure 5B:
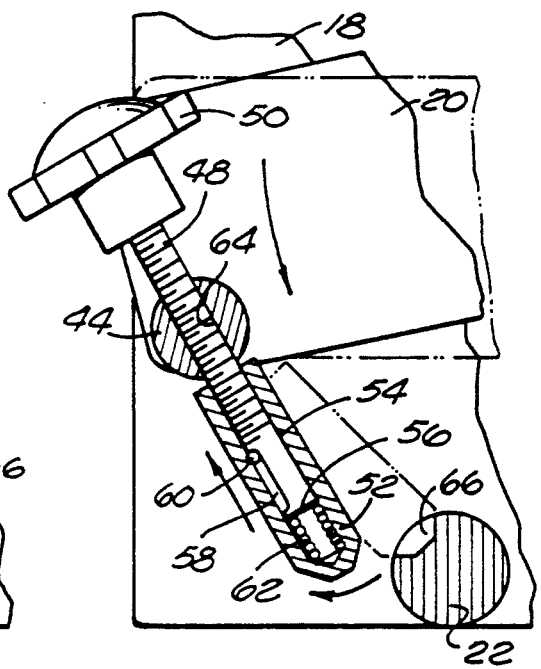

The screw mechanism 46 includes a threaded shaft 48, a knob 50 and a sleeve 52. Referring to FIGS. 5A and 5B, the sleeve 52 has a bore 54 for receiving an end 56 of the threaded shaft 48. The threaded shaft 48 also has a notch 58 for receiving a pin 60 for securing the sleeve 52 to the threaded shaft 48. The notch 58 permits a small amount of relative movement between the threaded shaft 48 and the sleeve 52. A spring 62 may also be provided in the bore 54 of the sleeve to press against the end 56 of the threaded shaft 48.

The bar 44 is provided with a threaded bore 64 for receiving the threaded shaft 48 of the screwing mechanism 46. Connecting rod 22 is provided with a countersunk hole 66 for receiving one end 68 of the sleeve 52. To assemble the screwing mechanism, the knob 50 is screwed onto the threaded shaft 48 which in turn is screwed through the threaded bore 64 of the bar 44. The sleeve 52 is then placed over the end of the threaded shaft 48 and the pin 60 is inserted through the sleeve and into the notch 58 of the threaded shaft. The threaded shaft 48 is then further screwed through the bore 64 until the end 68 of the sleeve 52 engages the countersunk hole 66 of connecting rod 22.

In operation, pressure in the nip 40 is increased by turning the knob 50 to cause the bar 44 to ride up the threaded shaft 48. Thus, the bar 44 acts as a lever causing the rocker arms 20 to rotate clockwise about pivot rod 42, moving the bottom roller 14 closer to the top roller 12 and increasing pressure in the nip. To relieve the pressure in the nip, the knob 50 is turned in the opposite direction.

To prevent heat damage to the polyurethane cover 24 of the bottom roller 14, it is desirable that the top roller 12 be fully disengaged from the bottom roller 14 when the apparatus is not in operation. To fully relieve the pressure in the nip, the knob is turned until the sleeve may be released by an operator from the countersunk hole. The spring 62 may be used to permit the screwing mechanism to be more easily engaged and disengaged from the countersunk hole due to movement of the sleeve 52 relative to the threaded shaft 48 (see FIGS. 5A and 5B).

To mar or abrade a particular length of ribbon, one end of the ribbon is inserted into the nip. As the ribbon passes through the nip, the screw mechanism is manually adjusted to increase or decrease the pressure in the nip. For example, if a 0.01 inch ribbon is intended to be used with a single light source, then the gap between the top roller and bottom roller may be initially set at 0.003 inches and progressively widened to 0.005 inches as the ribbon passes through the nip. This will result in the ribbon having greater marring at the end that passed through the nip first. If two light sources are to be used with the ribbon, one at each end, the operator of the apparatus will insert the ribbon into the nip under low pressure, gradually increase the pressure until the middle of the ribbon is in the nip and then gradually decrease the pressure until marring of the ribbon is completed. Of course, the screw mechanism may be automated and/or programmable to obtain any pressure variation in the nip desired. Other variations in marring patterns may be made by placing only a portion of the ribbon through the nip or by moving the ribbon back and forth in the nip. A second set of non-marring rollers (not shown) may be used to keep pulling the substrate through the apparatus when the first set of rollers 12, 14 is open.

Figure 6:
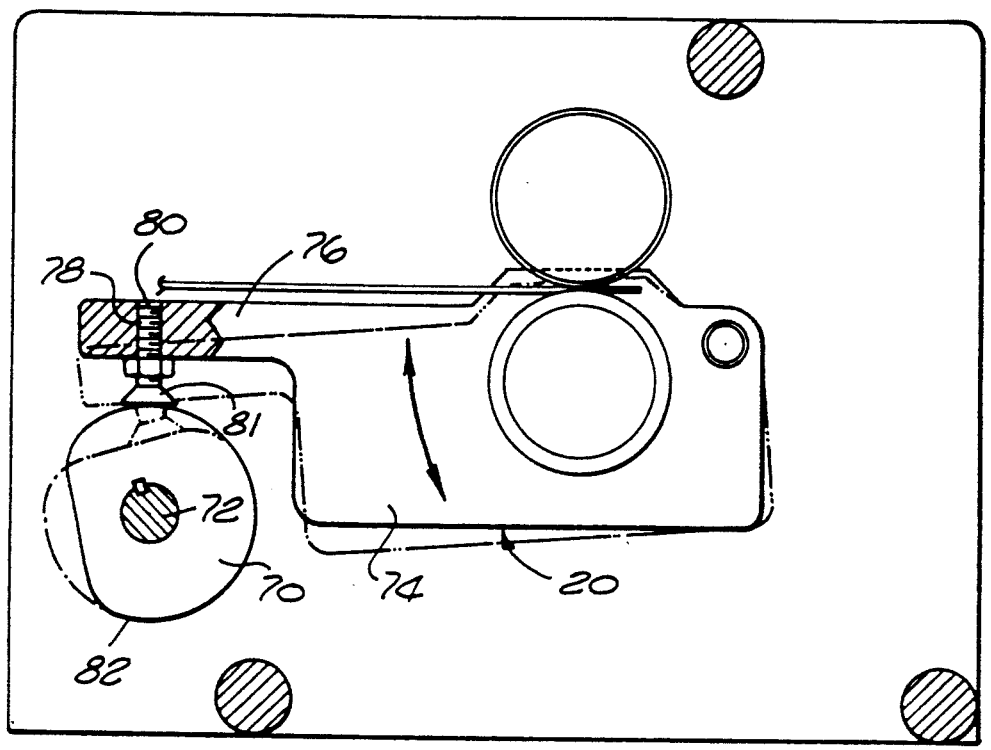
FIG. 6 is a cross-sectional side elevational view of a second preferred embodiment of the marring apparatus according to the present invention.
Figure 7:
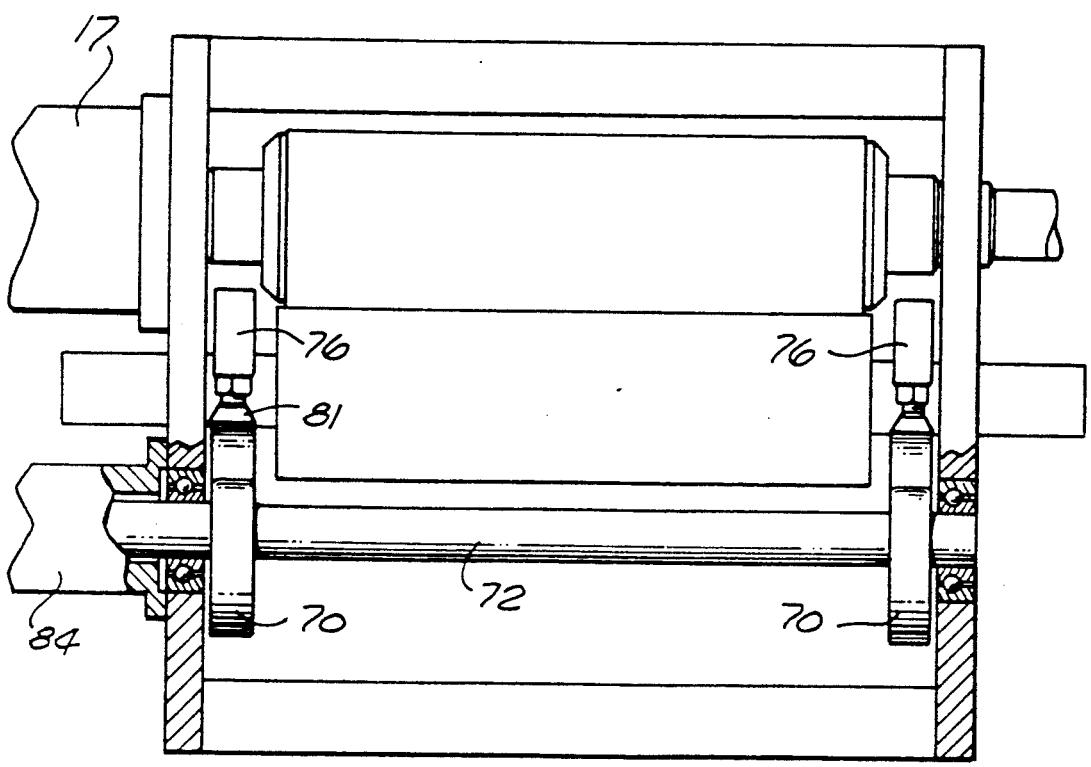
FIG. 7 is a cross-sectional front elevational view of the marring apparatus depicted in FIG. 6.

Referring to FIGS. 6 and 7, a second preferred embodiment for altering the pressure in the nip comprises at least one cam wheel 70 mounted on a camshaft 72 (two cam wheels are depicted in FIG. 7). An adjustable speed motor 84 is operatively connected to the camshaft 72. The rocker arms 20 in this embodiment each have a main portion 74 and an extension 76 that extends above each cam wheel 70. Each extension 76 also has a bore 78 for receiving an adjustment screw 80 having a stop 81 for setting the distance between the cam wheel 70 and the rocker arm 20. The surface 82 of the cam wheel may be profiled to impart any desired marring pattern onto a ribbon passing through the nip. Adjusting the speed of the cam wheel permits the same marring pattern to be applied to different length substrates. In FIG. 6, the rocker arm is shown, in phantom, in the disengaged position, i.e., the rocker arm is rotated sufficiently counterclockwise such that the bottom roller is released from the top roller.

Figure 8:
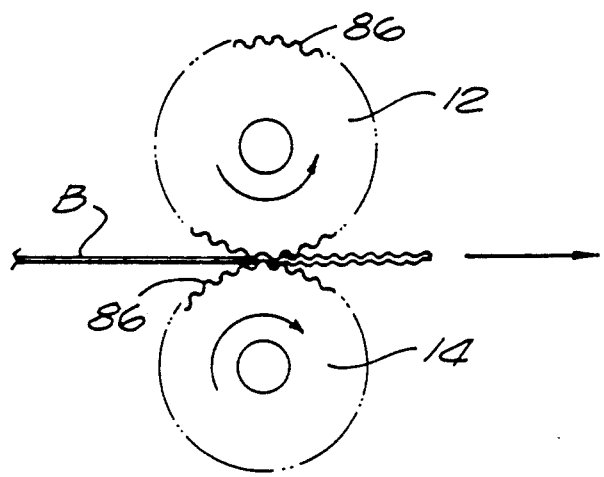
FIG. 8 is a cross-sectional side view of an alternative embodiment of the rollers.

Referring to FIG. 8, an alternative embodiment of the present invention is shown with rollers having serrated surfaces 86. The serrations are rounded and the top roller 12 meshes with the bottom roller 14. A substrate B passing through the nip will receive a rippled surface such that when the marred substrate is connected to a lightsource, light will emit from the ripples. Alternatively, only one roller may be serrated. As with the previous embodiments, the pressure in the nip may be adjusted during marring and/or the gap between the rollers may be greater at one end of the roller than the other.

Figure 9:
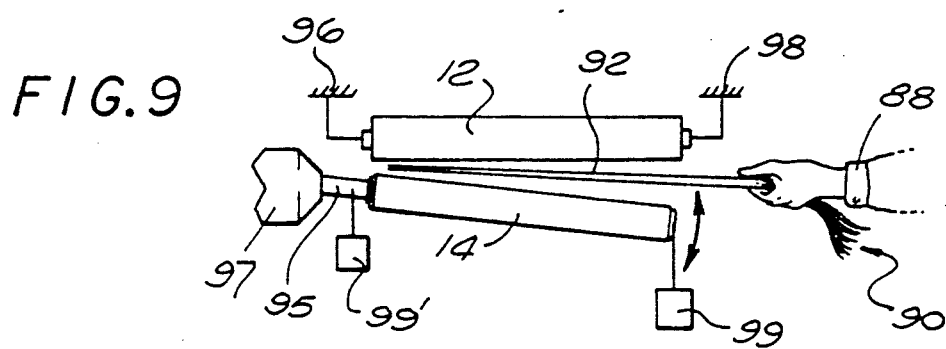
FIG. 9 is a schematic front elevational view of a second alternative embodiment of the rollers.

Referring to FIG. 9, a second alternative embodiment of the marring apparatus is shown in schematic form wherein the top roller 12 is horizontal and the bottom roller 14 is pivotable vertically about one end. Pressure in the nip will increase or decrease from one end of the rollers to the other depending upon the angle between the rollers. Alternatively, the top roller 12 or both rollers may be pivotable at one or both ends. The top roller 12 may be rotatably supported from above by supports 96, 98, e.g., by a structural frame or cantilevered beam (not shown). The bottom roller 14 is supported at one end through a flex joint 97 that permits rotation. The other end of the bottom roller 12 is supported by a hydraulic, pneumatic or other lift device 99 that can raise or lower the bottom roller, thus adjusting the angle between the rollers. Alternatively, the bottom roller 14 may be cantilevered. In this case, a lift device 99' may be placed on the shaft 95 of the roller near the flex joint 97. To provide suitable leverage, the shaft 95 may be slengthened.

In this embodiment, it is preferable to insert the substrate, e.g., a ribbon substrate, sideways through the nip. In this manner, the full length of the ribbon may be marred at one time. In particular, ribbon substrates often have a tail 90 at one end comprised of unbound optical fibers that need not be marred. An operator 88 (or supporting equipment) holds the tail 90 of the ribbon substrate and manually feeds the portion 92 of the substrate to be marred sideways between the rollers (the direction of movement of the substrate is into the paper in FIG. 9). This apparatus and procedure creates a marring pattern that gradually increases or decreases in intensity along the length of the substrate without the need for continuously adjusting the nip pressure as the substrate is passed through the nip.

Although the invention herein has been described with reference to particular embodiments, it is to be understood that these embodiments are merely illustrative of the principals and applications of the present invention. For example, the specific mechanisms for adjusting the pressure in the nip are merely representative and are deemed to afford the best embodiments known at this time. As an alternative embodiment, hydraulic or pneumatic devices may be used to directly lift the bottom roller closer to the top roller. Indeed, many other ways of changing pressure in the nip, with or without rocker arms, are known to those skilled in the art. Furthermore, it is to be understood that numerous modifications may be made to the illustrative embodiments and that other arrangements may be devised without departing from the spirit and scope of the present invention as defined by the appended claims.

I claim:

1. A method for marring a fiber optic substrate comprising;
   feeding the fiber optic substrate between a pair of rotating rollers that form a nip, said pair of rotating rollers comprising a first roller and a second roller wherein at least one roller has a roughened surface for marring the fiber optic substrate as it passes through the nip, and wherein at least one roller is adjustable to vary the pressure in the nip; and
   varying the pressure in the nip to obtain a predetermined marring pattern on the fiber optic substrate.

2. The method of marring a fiber optic substrate of claim 1 wherein the second roller has a rough surface.

3. The method of marring a fiber optic substrate of claim 1 wherein the second roller has a smooth hard surface.

4. The method of marring a fiber optic substrate of claim 1 wherein the second roller has a deformable cover.

5. The method of marring a fiber optic substrate of claim 1 further comprising the step of varying the speed of the substrate through the nip to obtain a predetermined marring pattern on the fiber optic substrate.

6. The method of marring a fiber optic substrate of claim 1 further comprising the step of heating at least one of the rollers before feeding the fiber optic substrate into the nip.

7. The method of marring a fiber optic substrate of claim 1 further comprising the step of creating a pressure differential in the nip along the length of the rollers.

8. The method of marring a fiber optic substrate of claim 7 wherein the pressure differential is created by applying greater pressure in the nip at one end of the pair of rollers than at the other end of the pair of rollers.

9. The method of marring a fiber optic substrate of claim 7 wherein the fiber optic substrate is fed sideways between the rollers.

10. The method of marring a fiber optic substrate of claim 1 wherein at least one of the rollers is serrated.

11. The method of marring a fiber optic substrate comprising;

feeding the fiber optic substrate between a pair of rotating rollers that form a nip, said pair of rotating rollers comprising a first roller and a second roller;

adjusting at least one of the rollers with respect to the other roller at least when the substrate passes through the nip to adjust the nip in order to vary the marring of the substrate to obtain variations in the amount of light escaping from the substrate along its length.

12. The method of marring a fiber optic substrate of claim 11, wherein the nip is adjusted in order to vary marring the substrate to obtain even illumination from the substrate along its length.

* * * * *